United States Patent
Ono et al.

(10) Patent No.: US 8,096,127 B2
(45) Date of Patent: Jan. 17, 2012

(54) EXHAUST TURBO-SUPERCHARGER

(75) Inventors: Yoshihisa Ono, Nagasaki (JP); Keiichi Shiraishi, Nagasaki (JP); Yoshitsugu Aono, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 476 days.

(21) Appl. No.: 12/309,593

(22) PCT Filed: Feb. 9, 2007

(86) PCT No.: PCT/JP2007/052344
§ 371 (c)(1),
(2), (4) Date: Jan. 23, 2009

(87) PCT Pub. No.: WO2008/099452
PCT Pub. Date: Aug. 21, 2008

(65) Prior Publication Data
US 2009/0241542 A1    Oct. 1, 2009

(51) Int. Cl.
*F02M 25/07* (2006.01)
*F02B 33/44* (2006.01)
(52) U.S. Cl. ............ 60/607; 60/608; 417/409; 415/119; 415/177
(58) Field of Classification Search ............ 60/624, 60/280, 607, 602, 608, 407; 417/409; 415/119, 415/177
See application file for complete search history.

(56) References Cited

U.S. PATENT DOCUMENTS

| | | | | |
|---|---|---|---|---|
| 5,355,074 A | * | 10/1994 | Nakano | 322/1 |
| 2005/0017151 A1 | * | 1/2005 | Battig | 248/678 |

FOREIGN PATENT DOCUMENTS

| | | |
|---|---|---|
| JP | 61-142332 | 6/1986 |
| JP | 61-130723 | 8/1986 |
| JP | 3-115737 | 5/1991 |
| JP | 03115737 A * | 5/1991 |
| JP | 9-209770 | 8/1997 |
| JP | 9-217631 | 8/1997 |
| JP | 2004-150367 | 5/2004 |
| JP | 2004-346803 | 12/2004 |
| JP | 2005-516143 | 6/2005 |
| JP | 2006-322425 | 11/2006 |

OTHER PUBLICATIONS

International Search Report mailed Mar. 6, 2007 for International Application No. PCT/JP2007/052344.

* cited by examiner

*Primary Examiner* — Quyen Leung
*Assistant Examiner* — Leda Pham
(74) *Attorney, Agent, or Firm* — Wenderoth, Lind & Ponack, L.L.P.

(57) ABSTRACT

An exhaust turbo-supercharger is capable of preventing misalignment of the center of the rotating shaft of a supercharger turbine and the center of the rotating shaft of a supercharger compressor, or, misalignment of the center of the rotating shaft of the supercharger turbine, the center of the rotating shaft of the supercharger compressor, and the center of the rotating shaft of a power generator, due to the heat of exhaust gas; is capable of reducing vibration of these rotation axes; and is capable of improving the reliability of the entire supercharger. The exhaust turbo-supercharger has a casing that supports a turbine unit and a compressor unit.

The lower end of the casing constitutes a leg portion, and the leg portion is fixed to a base placed on the floor. A power generator having a rotating shaft is connected to a rotating shaft of the turbine unit and the compressor unit.

17 Claims, 3 Drawing Sheets

EXHAUST TURBO-SUPERCHARGER

BACKGROUND OF THE INVENTION (1) Field of the Invention

The present invention relates to exhaust turbo-superchargers, and more specifically, to exhaust turbo-superchargers installed on internal combustion engines for ships, internal combustion engines for onshore power generators, and the like.

(2) Description of Related Art

As such an exhaust turbo-supercharger, there is a known exhaust turbo-supercharger having a power generator whose rotating shaft is connected to rotation axes of a turbine and compressor of a supercharger (for example, refer to Patent Document 1).

Patent Document 1: Japanese Unexamined Patent Application, Publication No. 2004-346803

BRIEF SUMMARY OF THE INVENTION

The exhaust turbo-supercharger disclosed in the above-mentioned Patent Document is fixed to a base with a supporting member provided on the supercharger side and a supporting member provided on the power generator side. Thus, the supporting member on the supercharger side undergoes large thermal expansion in its longitudinal direction (top-bottom direction) due to the heat of the exhaust gas whereas the supporting member on the power generator side undergoes no thermal expansion due to the heat of the exhaust gas. This leads to a significant misalignment of the center of the rotating shaft of the supercharger turbine, the center of the rotating shaft of the supercharger compressor, and the center of the rotating shaft of the power generator, which could cause abnormal vibration of these rotation axes. This can be understood from FIG. 5 of the above-mentioned Patent Document (i.e., the figure showing a significant difference between the vibration amplitude of the rotating shaft on the supercharger side and the vibration amplitude of the rotating shaft on the power generator side).

The present invention has been made in view of the above-described circumstances, and an object thereof is to provide an exhaust turbo-supercharger capable of preventing misalignment of the center of the rotating shaft of the supercharger turbine and the center of the rotating shaft of the supercharger compressor, or, misalignment of the center of the rotating shaft of the supercharger turbine, the center of the rotating shaft of the supercharger compressor, and the center of the rotating shaft of the power generator, due to the heat of the exhaust gas; capable of reducing vibration of these rotation axes; and capable of improving the reliability of the entire supercharger.

To solve the above-described problem, the present invention employs the following solutions.

An exhaust turbo-supercharger of the present invention is an exhaust turbo-supercharger including a turbine unit driven by exhaust gas guided from an internal combustion engine, a compressor unit that is driven by the turbine unit and forces outside air to the internal combustion engine, and a casing that supports the turbine unit and the compressor unit. A lower end of the casing constitutes a leg portion, and the leg portion is fixed to a base placed on a floor. A power generator having a rotating shaft connected to rotation axes of the turbine unit and the compressor unit is provided.

In such an exhaust turbo-supercharger, because the weight of the entire supercharger is transmitted to the base only through the leg portion of the casing (that is, supported only by the leg portion), major thermal expansion due to the heat of the exhaust gas occurs in the top-bottom direction (vertical direction) of the casing and the axial direction of the rotating shaft (the direction perpendicular to the top-bottom direction of the casing).

Because the casing supports both the turbine unit and the compressor unit, misalignment of the center of the rotating shaft of the turbine unit and the center of the rotating shaft of the compressor unit, due to the heat of the exhaust gas (due to the thermal-expansion difference), can be prevented, vibration of these rotation axes can be reduced, and the reliability of the entire supercharger can be improved.

In addition, the rotating shaft of the power generator rotates with the rotation axes of the turbine unit and compressor unit, and excess energy is recovered by the power generator. This can improve the thermal efficiency of, for example, ships and power plants.

It is more preferable that a muffler connected to an air-intake system of the internal combustion engine and supported by the casing through the compressor unit be provided upstream of the compressor unit, a shell housing having a hollow portion inside thereof is provided at the central portion of the muffler, the power generator is accommodated in the hollow portion.

In such an exhaust turbo-supercharger, because the power generator is accommodated in the muffler such that it is almost entirely covered, the apparatus can be made compact.

Furthermore, it is preferable that the power generator be configured to also have a motor function.

In such an exhaust turbo-supercharger, the power generator can be used as a starter to force outside air directly from the compressor unit to the internal combustion engine, instead of forcing outside air to the internal combustion engine from an auxiliary blower or the like.

An internal combustion engine of the present invention includes the exhaust turbo-supercharger according to any one of the above-described exhaust turbo-superchargers.

Because such an internal combustion engine has a highly reliable exhaust turbo-supercharger causing little vibration, outside air is stably forced into the internal combustion engine. This allows the internal combustion engine to exert its full performance, and the reliability of the internal combustion engine can be improved.

According to the present invention, advantages are provided in that it is possible to prevent misalignment of the center of the rotating shaft of the supercharger turbine and the center of the rotating shaft of the supercharger compressor, or misalignment of the center of the rotating shaft of the supercharger turbine, the center of the rotating shaft of the supercharger compressor, and the center of the rotating shaft of the power generator, due to the heat of the exhaust gas; the vibration of these rotation axes can be reduced; and the reliability of the supercharger can be improved.

EXPLANATION OF REFERENCE SIGNS

Figure 1:
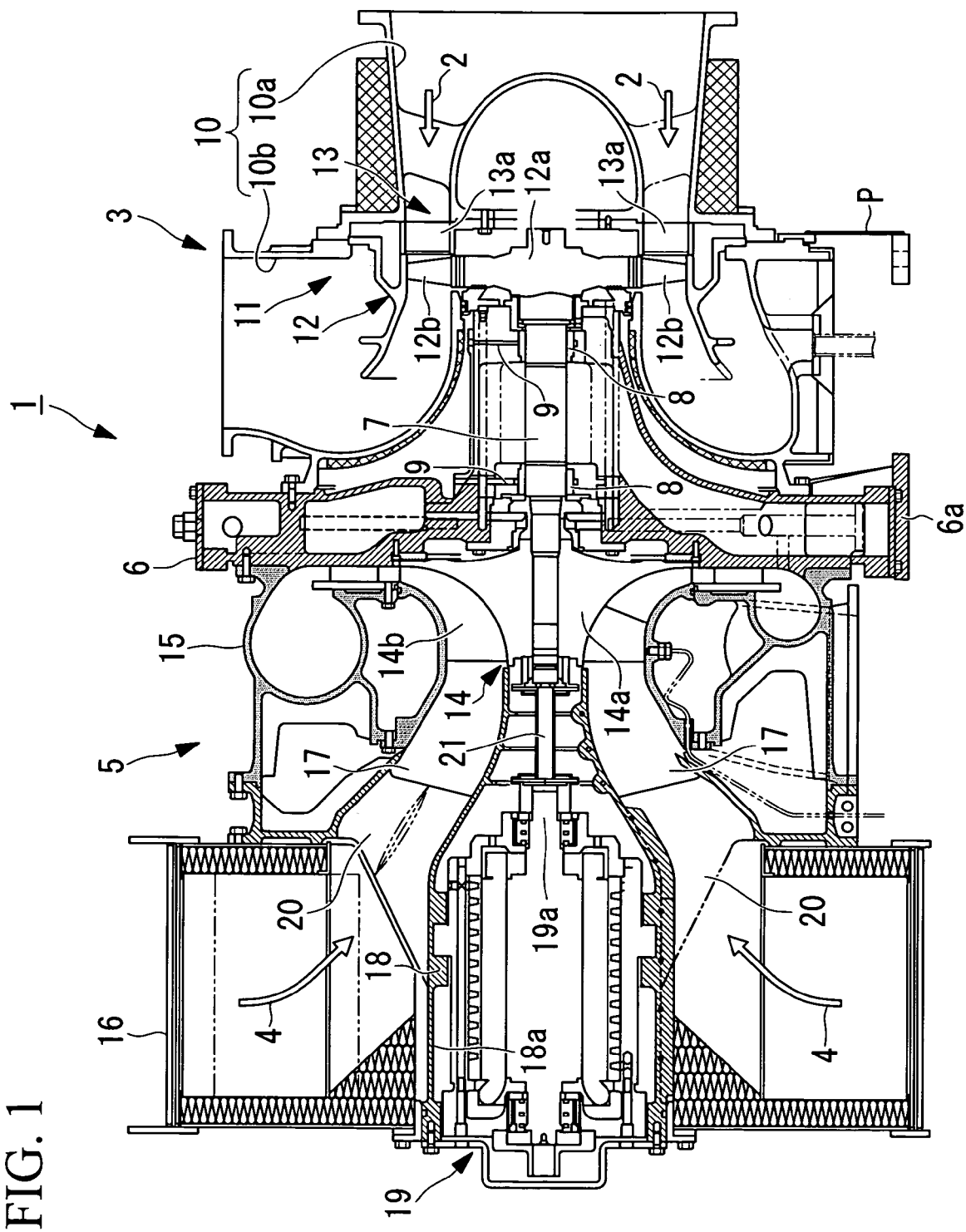
FIG. 1 is a vertical sectional view showing an exhaust turbo-supercharger according to an embodiment of the present invention.

1: exhaust turbo-supercharger
2: exhaust gas
3: turbine unit
4: outside air
5: compressor unit
6: casing
6a: leg portion
7: rotating shaft
16: muffler
18: shell housing
18a: hollow portion
19: power generator
19a: rotating shaft

DETAILED DESCRIPTION OF THE INVENTION

An exhaust turbo-supercharger according to an embodiment of the present invention will be described below with reference to the drawings.

Figure 2:
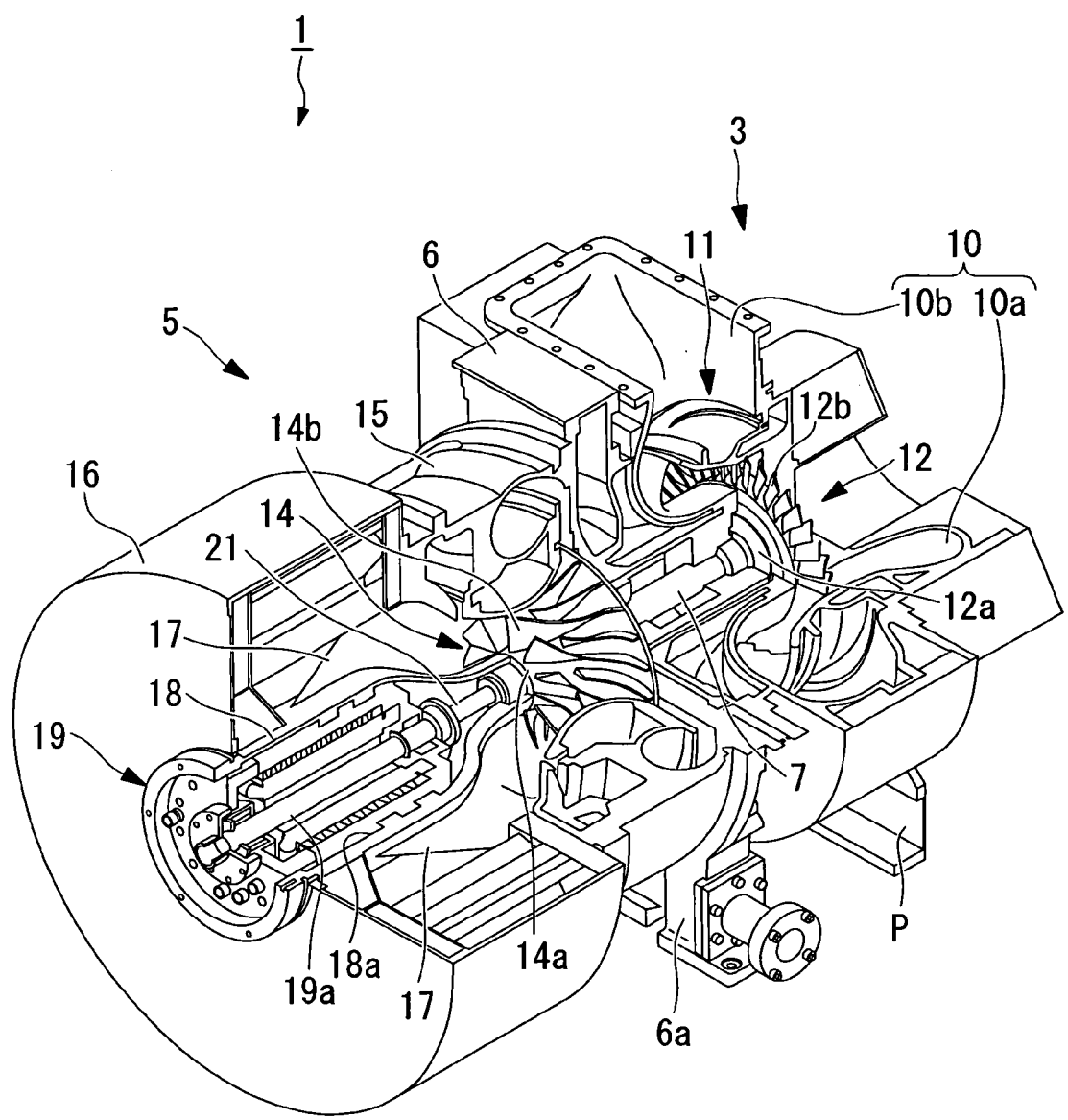
FIG. 2 is a partially cut-away perspective view of the exhaust turbo-supercharger shown in FIG. 1, viewed from a muffler side.
Figure 3:
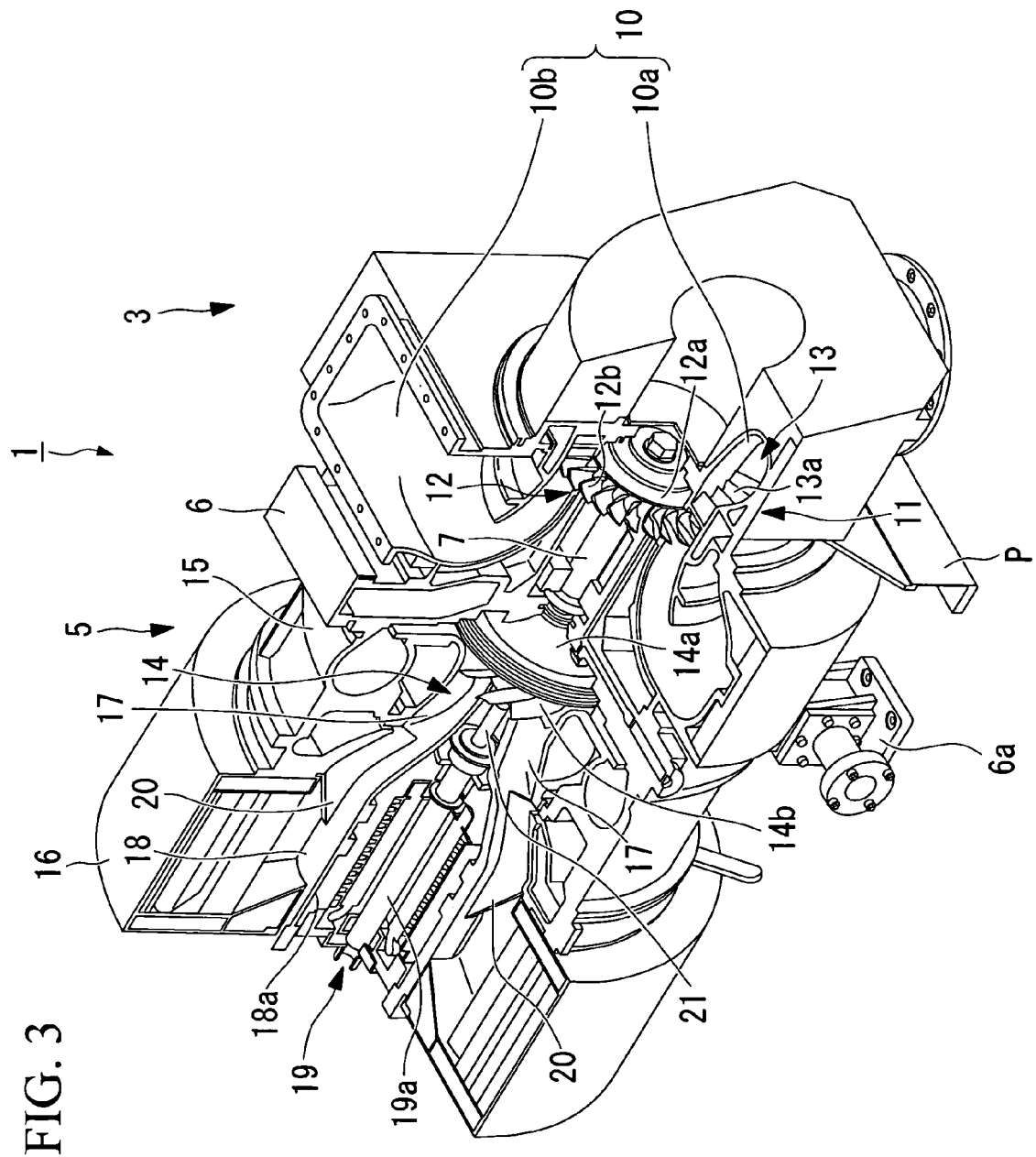
FIG. 3 is a partially cut-away perspective view of the exhaust turbo-supercharger shown in FIG. 1, viewed from a turbine unit side.

As shown in FIGS. 1 to 3, an exhaust turbo-supercharger 1 according to this embodiment consists of main components including a turbine unit 3 driven by exhaust gas (combustion gas) 2 guided from an internal combustion engine (for example, a diesel engine or a gas turbine engine, not shown), a compressor unit 5 driven by the turbine unit 3 to force outside air 4 to the internal combustion engine, and a casing 6 that is provided between the turbine unit 3 and the compressor unit 5 and supports them.

A rotating shaft 7, one end of which extends toward the turbine unit 3 and the other end of which extends toward the compressor unit 5, is inserted through the casing 6. The rotating shaft 7 is supported rotatably about its axis by a bearing 8 provided in the casing 6. The casing 6 is also provided with a lubricant supply path 9 for supplying a lubricant from a lubricant reservoir (not shown) to the bearing 8.

The lower end of the casing 6 constitutes a leg portion 6a that supports the casing 6 at a single point in the axial direction of the rotating shaft 7 (there are also cases where it is supported at two or more points in a direction perpendicular to the axial direction of the rotating shaft 7), and the leg portion 6a is fixed to a base (not shown) placed on the floor. That is, the weight of the exhaust turbo-supercharger 1 is transmitted to the base through the leg portion 6a.

The reference numeral P in the drawings denotes a punching plate. The punching plate P is fixed to the lower end of the turbine unit 3 at one end and, similarly to the leg portion 6a of the casing 6, is fixed to the base at the other end. The punching plate P is not intended to support the weight of the exhaust turbo-supercharger 1 like the leg portion 6a, but is intended to prevent the exhaust turbo-supercharger 1 from shaking (vibrating) relative to the base.

The turbine unit 3 has an exhaust gas passage 10 connected to an exhaust system of the internal combustion engine, to which at least a portion of the exhaust gas 2 is supplied, and a turbine 11 that receives the flow of the exhaust gas 2 supplied to the exhaust gas passage 10 and is rotationally driven thereby.

The turbine 11 has a turbine rotor 12 and a turbine nozzle 13. The turbine rotor 12 has a disc-shaped turbine disc 12a provided at one end of the rotating shaft 7 and a plurality of turbine blades 12b, having an airfoil-shaped cross-section, mounted on the outer circumference of the turbine disc 12a.

The turbine nozzle 13 consists of a plurality of nozzle-guide vanes 13a arranged in a circle and is disposed upstream of the turbine blades 12b.

The exhaust gas passage 10 has a supply path 10a that is connected to the exhaust system of the internal combustion engine and guides the exhaust gas 2 to the nozzle-guide vanes 13a and the turbine blades 12b, and a discharging path 10b that is provided so as to extend radially outward of the turbine 11 and guides the exhaust gas 2 having passed through the turbine 11 to the outside of the system or to an exhaust purifier (not shown), etc.

The compressor unit 5 has a compressor impeller 14 that discharges outside air 4 radially outward by being rotationally driven and a centrifugal chamber 15 that surrounds the periphery of the compressor impeller 14 and compresses the outside air 4 discharged by the compressor impeller 14.

The compressor impeller 14 has a substantially disc-shaped hub 14a attached to the other end of the rotating shaft 7 and a plurality of vanes 14b extending radially outward from the outer surface of the hub 14a and arranged in a circle around the circumferential direction.

A muffler (silencer) 16 connected to an air-intake system of the internal combustion engine is disposed adjacent to the upstream side of the compressor unit 5. The outside air 4 having passed through the muffler 16 is guided to the vanes 14b of the compressor impeller 14 through an inlet path 17. At the downstream side of the compressor unit 5, an intercooler, a surge tank, and the like (not shown) are provided. The outside air 4 having passed through the centrifugal chamber 15 is supplied to the internal combustion engine after passing through the intercooler, the surge tank, and the like.

A shell housing 18 having a hollow portion 18a inside thereof formed so as to taper toward an end face of the hub 14a is provided at the central portion of the muffler 16, and a (high-speed induction) power generator 19 is accommodated in the hollow portion 18a. The shell housing 18 is fixed to the compressor unit 5 (a radially outside wall surface forming the inlet path 17) through a plurality of (for example, four) supports 20 provided in the inlet path 17. The outer surface of the shell housing 18 constitutes a radially inside wall surface forming the inlet path 17.

The power generator 19 is disposed such that a rotating shaft 19a thereof is aligned with the rotating shaft 7, and the rotating shaft 19a is connected to the tip at one end of the rotating shaft 7 extending through the hub 14a and projecting toward the muffler 16, through a flexible coupling 21. That is, the rotating shaft 19a of the power generator 19 rotates with the rotating shaft 7.

Because the exhaust gas turbine supercharger 1 according to this embodiment is configured such that the weight of the entire supercharger is transmitted to the base only through the leg portion 6a of the casing 6 (that is, supported only by the leg portion 6a), the major thermal expansion due to the heat of the exhaust gas 2 occurs in the longitudinal direction (top-bottom direction) of the casing 6 and the axial direction of the rotating shaft 7 (the direction perpendicular to the longitudinal direction of the casing 6).

This makes it possible to prevent misalignment of the center of the rotating shaft 7, the center of the flexible coupling 21, and the center of the rotating shaft 19a, due to the heat of the exhaust gas 2 (due to the thermal-expansion difference), to reduce vibration of these rotation axes 7 and 19 and the flexible coupling 21, and to improve the reliability of the entire supercharger.

Because the power generator 19 is configured to be accommodated in the shell housing 18 provided in the muffler 16, the apparatus can be made compact.

Furthermore, when the power generator 19 is configured to also be used as a motor, the power generator 19 can be used as a starter to force the outside air 4 directly from the compressor unit 5 to the internal combustion engine, instead of forcing the outside air 4 to the internal combustion engine from an auxiliary blower or the like.

The invention claimed is:

1. An exhaust turbo-supercharger comprising:
   a turbine unit driven by exhaust gas guided from an internal combustion engine;
   a compressor unit that is driven by the turbine unit and forces outside air to the internal combustion engine;
   a casing that supports the turbine unit and the compressor unit;
   a muffler supported by the casing through the compressor unit and provided upstream of the compressor unit for being connected to an air-intake system of the internal combustion engine;
   a shell housing having a hollow portion inside thereof and provided at a central portion of the muffler; and
   a power generator having a rotating shaft that rotates with the turbine unit and the compression unit,
   wherein the power generator is accommodated in the hollow portion of the shell housing.

2. The exhaust turbo-supercharger according to claim 1, wherein the power generator is configured to also have a motor function.

3. An internal combustion engine comprising the exhaust turbo-supercharger according to claim 1.

4. The exhaust turbo-supercharger according to claim 1, wherein the hollow portion of the shell housing tapers toward an end face of the shell housing.

5. The exhaust turbo-supercharger according to claim 1, wherein the shell housing is disposed inside the muffler and forms a radially inside wall surface of an inlet path for the outside air passing from the muffler to the compressor unit.

6. The exhaust turbo-supercharger according to claim 5, wherein the shell housing is fixed to the compressor unit through a support provided in the inlet path.

7. The exhaust turbo-supercharger according to claim 1, wherein the compressor unit has a rotating shaft, and the rotating shaft of the power generator is connected to the rotating shaft of the compressor unit.

8. The exhaust turbo-supercharger according to claim 1, wherein the compressor unit has a rotating shaft,
   wherein the compressor unit and the turbine unit are disposed on opposite sides of the casing from each other, and
   wherein a bearing is providing in the casing and the bearing supports the rotating shaft of the compressor unit.

9. The exhaust turbo-supercharger according to claim 1, wherein a lower end of the casing constitutes a leg portion, and the leg portion is configured to be fixed to a base, and
   wherein the weight of the exhaust turbo-supercharger is supported only through the leg portion of the casing.

10. The exhaust turbo-supercharger according to claim 1, wherein the compressor unit has a rotating shaft,
    wherein the compressor unit and the turbine unit are disposed on opposite sides of the casing from each other,
    wherein a bearing is providing in the casing and the bearing supports the rotating shaft of the compressor unit,
    wherein a lower end of the casing constitutes a leg portion, and the leg portion is configured to be fixed to a base, and
    wherein the weight of the exhaust turbo-supercharger is supported only through the leg portion of the casing.

11. The exhaust turbo-supercharger according to claim 10, wherein the power generator is configured to also have a motor function.

12. An internal combustion engine comprising the exhaust turbo-supercharger according to claim 10.

13. The exhaust turbo-supercharger according to claim 10, wherein the hollow portion of the shell housing tapers toward an end face of the shell housing.

14. The exhaust turbo-supercharger according to claim 10, wherein the shell housing is disposed inside the muffler and forms a radially inside wall surface of an inlet path for the outside air passing from the muffler to the compressor unit.

15. The exhaust turbo-supercharger according to claim 14, wherein the shell housing is fixed to the compressor unit through a support provided in the inlet path.

16. The exhaust turbo-supercharger according to claim 10, wherein the rotating shaft of the power generator is connected to the rotating shaft of the compressor unit.

17. The exhaust turbo-supercharger according to claim 10, wherein a longitudinal axis of the shell housing is concentric with a longitudinal axis of the muffler.

\* \* \* \* \*